(12) United States Patent
Takaoka et al.

(10) Patent No.: US 10,218,897 B2
(45) Date of Patent: Feb. 26, 2019

(54) DISPLAY CONTROL DEVICE AND METHOD TO DISPLAY A PANORAMIC IMAGE

(75) Inventors: Lyo Takaoka, Tokyo (JP); Takashi Nunomaki, Kanagawa (JP); Ryoko Amano, Tokyo (JP); Kenzo Nishikawa, Tokyo (JP); Ritsuko Kano, Tokyo (JP); Tomoya Narita, Kanagawa (JP); Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 164 days.

(21) Appl. No.: 13/314,486

(22) Filed: Dec. 8, 2011

(65) Prior Publication Data

US 2012/0154442 A1    Jun. 21, 2012

(30) Foreign Application Priority Data

Dec. 21, 2010  (JP) ................ 2010-284321

(51) Int. Cl.
    *H04N 5/232*       (2006.01)

(52) U.S. Cl.
    CPC ......... *H04N 5/23216* (2013.01); *H04N 5/232* (2013.01); *H04N 5/23238* (2013.01); *H04N 5/23293* (2013.01)

(58) Field of Classification Search
    CPC .. G09G 5/00; G09G 3/22; G06F 3/041; G06F 3/048; G06F 17/00; G06F 3/00; G06F 3/0416; G06F 3/04817; G06F 3/0485; G06F 5/00; H04N 5/232; H04N 5/23293; H04N 5/23216; H04N 5/23238
    USPC ....... 345/667, 634, 173, 629, 660, 428, 684; 715/786, 39, 816; 348/39
    See application file for complete search history.

(56) References Cited

U.S. PATENT DOCUMENTS

| 5,467,441 A * | 11/1995 | Stone et al. .................. 345/619 |
| 5,854,629 A * | 12/1998 | Redpath ................ G06F 3/0482 715/830 |
| 6,769,131 B1 * | 7/2004 | Tanaka ................... H04N 7/181 348/E7.086 |
| 6,919,927 B1 * | 7/2005 | Hyodo .................... 348/333.02 |

(Continued)

FOREIGN PATENT DOCUMENTS

| JP | 05-260430 A | 10/1993 |
| JP | 2000-152168 | 5/2000 |

(Continued)

OTHER PUBLICATIONS

U.S. Appl. No. 13/285,031, filed Oct. 31, 2011, Nunomaki.

(Continued)

*Primary Examiner* — Samantha (Yuehan) Wang
*Assistant Examiner* — Michael Le
(74) *Attorney, Agent, or Firm* — Chip Law Group

(57) ABSTRACT

A display control device includes a display controller executing display control to display, on a display screen of a display device displaying an image, a whole of a display target image that is to be displayed and that has an aspect ratio differing from an aspect ratio of the display screen, and to display a partial enlarged image, which is obtained by enlarging a partial image corresponding to a part of the display target image and which has a smaller size than the display screen, at a displayed position of the partial image in superimposed relation to the display target image.

12 Claims, 9 Drawing Sheets

(56) References Cited

U.S. PATENT DOCUMENTS

| | | | | |
|---|---|---|---|---|
| 7,206,017 | B1* | 4/2007 | Suzuki | 348/36 |
| 8,082,518 | B2* | 12/2011 | Flake | G06F 3/0481 |
| | | | | 715/785 |
| 2006/0146009 | A1* | 7/2006 | Syrbe | A63F 13/00 |
| | | | | 345/156 |
| 2008/0062141 | A1* | 3/2008 | Chandhri | G06F 3/0482 |
| | | | | 345/173 |
| 2008/0270936 | A1* | 10/2008 | Bebrisson | G06F 3/0481 |
| | | | | 715/788 |
| 2009/0128646 | A1* | 5/2009 | Itoh | H04N 5/23293 |
| | | | | 348/220.1 |
| 2009/0288032 | A1* | 11/2009 | Chang | G06F 3/0483 |
| | | | | 715/776 |
| 2010/0156806 | A1* | 6/2010 | Stallings | 345/173 |
| 2011/0001759 | A1* | 1/2011 | Kim | H04N 7/0122 |
| | | | | 345/629 |
| 2011/0187750 | A1* | 8/2011 | Ko et al. | 345/661 |
| 2011/0298917 | A1* | 12/2011 | Yanagita | G03B 5/02 |
| | | | | 348/135 |
| 2012/0026194 | A1* | 2/2012 | Wagner | G06F 3/0485 |
| | | | | 345/647 |
| 2012/0075351 | A1* | 3/2012 | Imai | G06F 3/0485 |
| | | | | 345/684 |

FOREIGN PATENT DOCUMENTS

| | | |
|---|---|---|
| JP | 2007-072233 A | 3/2007 |
| JP | 2007-316982 A | 12/2007 |
| JP | 2009-268037 A | 11/2009 |
| JP | 2010-081589 A | 4/2010 |

OTHER PUBLICATIONS

U.S. Appl. No. 13/292,769, filed Nov. 9, 2011, Nunomaki.
U.S. Appl. No. 13/281,490, filed Oct. 26, 2011, Amano, et al.
U.S. Appl. No. 13/324,463, filed Dec. 13, 2011, Takaoka, et al.
Office Action dated May 20, 2014 in Japanese Patent Application No. 2010-284321.

* cited by examiner

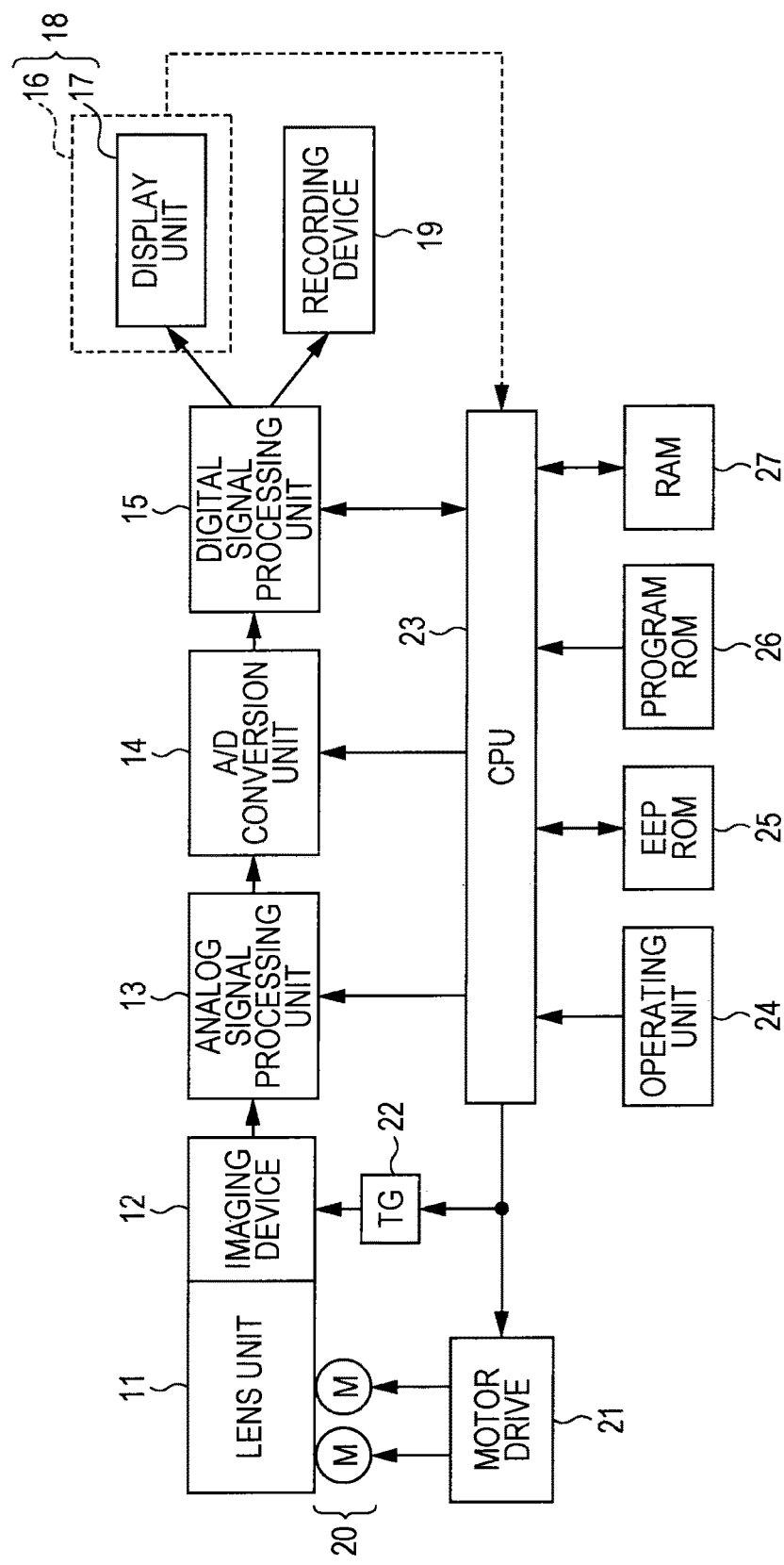

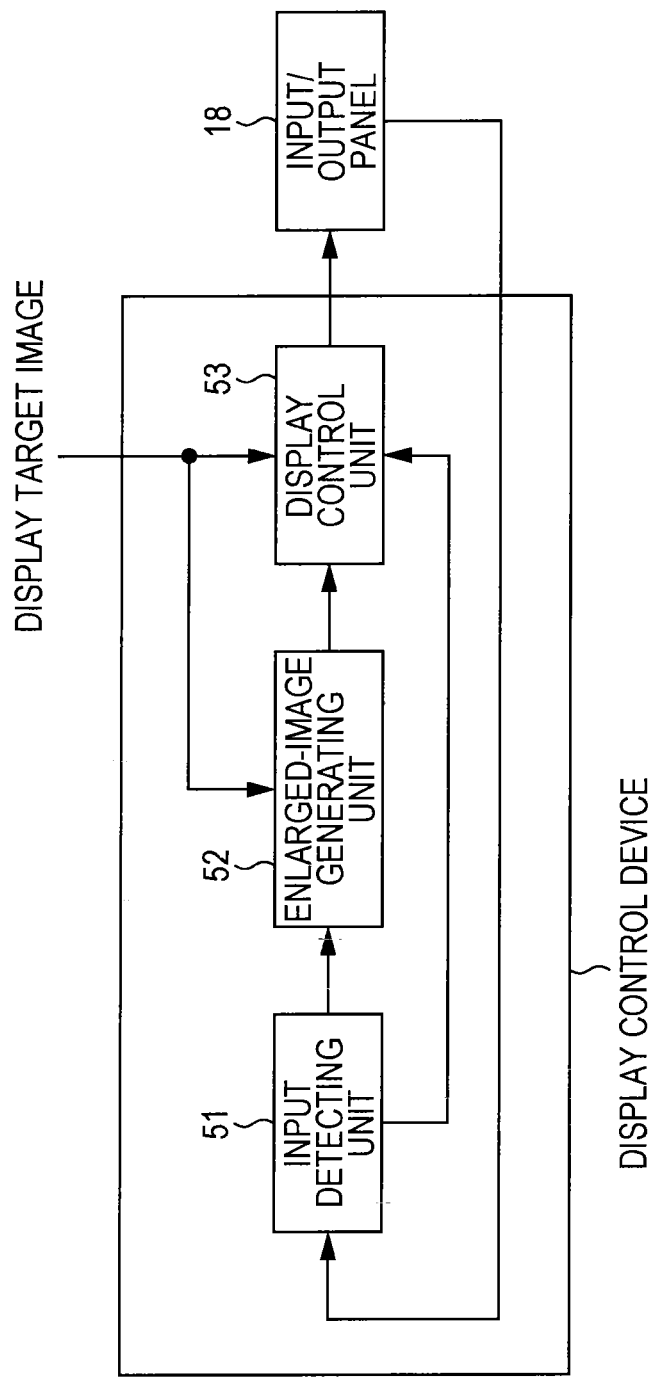

DISPLAY TARGET IMAGE  18

PARTIAL ENLARGED IMAGE

DISPLAY TARGET IMAGE  18

PARTIAL ENLARGED IMAGE

DISPLAY TARGET IMAGE  18

DISPLAY CONTROL DEVICE AND METHOD TO DISPLAY A PANORAMIC IMAGE

BACKGROUND

The present technology relates to a display control device, a display control method, and a program. More specifically, the present technology relates to a display control device, a display control method, and a program, which enable, e.g., the whole and partial details of an image to be confirmed at the same time.

A digital camera (digital still camera), for example, includes a liquid crystal panel having an aspect ratio of 4:3 or 16:9 and can display, on the liquid crystal panel, an image (e.g., a still picture as a photograph) taken by the digital camera.

Meanwhile, some of recent digital cameras can take a horizontally long (or vertically long) panorama image by continuously taking an image while the digital camera is panned (or tilted).

Because such a panorama image has an aspect ratio differing from that of the liquid crystal panel of the digital camera, i.e., because the panorama image is horizontally longer than the liquid crystal panel having the aspect ratio of 4:3 or 16:9, display of the panorama image on the liquid crystal panel is restricted.

In more detail, when the whole of the panorama image is to be displayed on the liquid crystal panel, the panorama image is displayed in a reduced size. Also, when the panorama image is to be displayed in an enlarged size on the liquid crystal panel, just a part of the panorama image can be displayed and the whole of the panorama image is not displayed.

In view of the above-described point, an image reproducing device is proposed which displays a part of a panorama image in an enlarged scale over an entire liquid crystal panel, and which provides superimposed display indicating which part of the panorama image is displayed on the liquid crystal panel (see, e.g., Japanese Unexamined Patent Application Publication No. 2000-152168).

SUMMARY

For an image having an aspect ratio differing from that of the liquid crystal panel, e.g., a panorama image, it is convenient if the whole and partial details of such an image can be both confirmed at the same time. For that reason, proposals of various techniques for image display control realizing that confirmation are demanded.

In consideration of the above-described situation in the art, it is desirable to enable the whole and partial details of an image to be both confirmed at the same time.

According to one embodiment of the present technology, there is provided a display control device or a program causing a computer to function as a display control device, the display control device including a display controller executing display control to display, on a display screen of a display device displaying an image, a whole of a display target image that is to be displayed and that has an aspect ratio differing from an aspect ratio of the display screen, and to display a partial enlarged image, which is obtained by enlarging a partial image corresponding to a part of the display target image and which has a smaller size than the display screen, at a displayed position of the partial image in superimposed relation to the display target image.

According to another embodiment of the present technology, there is provided a display control method executing display control to display, on a display screen of a display device displaying an image, a whole of a display target image that is to be displayed and that has an aspect ratio differing from an aspect ratio of the display screen, and to display a partial enlarged image, which is obtained by enlarging a partial image corresponding to a part of the display target image and which has a smaller size than the display screen, at a displayed position of the partial image in superimposed relation to the display target image.

With the embodiments of the present technology, the whole of the display target image, which is to be displayed and which has the aspect ratio differing from that of the display screen of the display device displaying an image, is displayed on the display screen, and the partial enlarged image, which is obtained by enlarging the partial image corresponding to a part of the display target image and which has a smaller size than the display screen, is displayed at the displayed position of the partial image in superimposed relation to the display target image.

The display control device may be an independent device or an internal block as a component of one device.

The program can be supplied by transmitting it through a transmission medium, or in a form recorded on a recording medium.

With the embodiments of the present technology, the whole and partial details of the image can be both confirmed at the same time.

BRIEF DESCRIPTION OF THE DRAWINGS

FIG. 1 is a block diagram illustrating an example of configuration of a digital camera according to one embodiment of the present technology;

FIG. 3 is a block diagram illustrating an example of functional configuration of a display control device;

DETAILED DESCRIPTION OF EMBODIMENTS

Figure 2A:
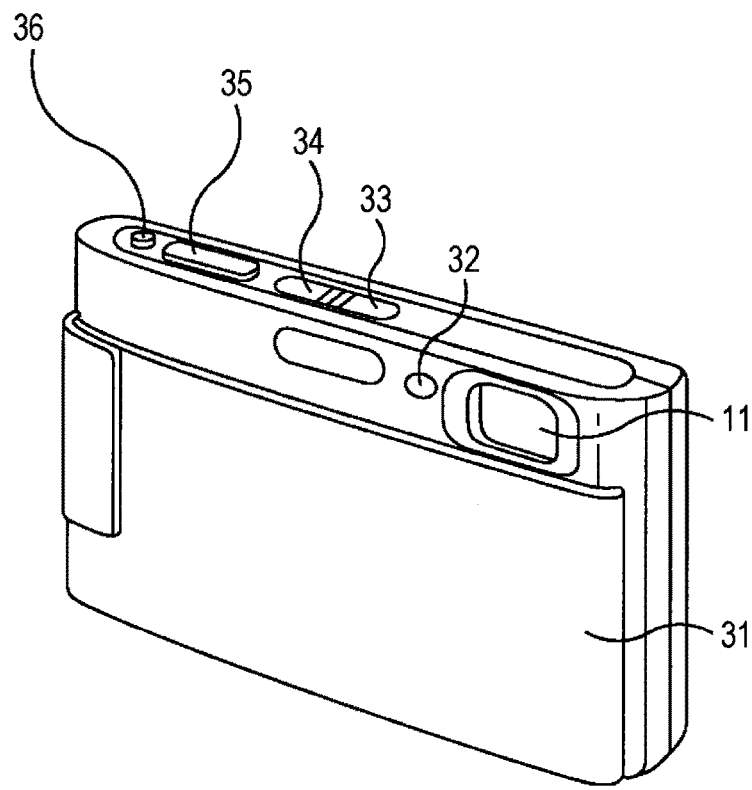
FIGS. 2A and 2B are perspective views illustrating an example of external configuration of the digital camera.

[Digital Camera According to One Embodiment of Present Technology]

FIG. 1 is a block diagram illustrating an example of configuration of a digital camera according to one embodiment of the present technology.

A lens unit 11 includes a photographing lens, a diaphragm, a focusing lens, etc. Light incident on the lens unit 11 is directed to an imaging device 12.

The imaging device 12 is constituted by, e.g., a CCD (Charge Coupled Device), or a CMOS (Complementary Metal Oxide Semiconductor) imager. The imaging device 12 performs photoelectrical conversion of the light incoming from the lens unit 11 and supplies a converted analog image signal to an analog signal processing unit 13.

The analog signal processing unit 13 executes analog signal processing, such as a correlated double sampling process and an automatic gain control process, on the image signal from the imaging device 12, and it supplies the processed image signal to an A/D (Analog/Digital) conversion unit 14.

The A/D (Analog/Digital) conversion unit 14 performs A/D conversion of the image signal from the analog signal processing unit 13 and supplies resulting digital image data to a digital signal processing unit 15.

The digital signal processing unit 15 executes digital signal processing, such as a white balance control process, a noise reduction process, and a necessary compression coding process (e.g., JPEG (Joint Photographic Experts Group) coding), on the image data from the A/D conversion unit 14, and it supplies resulting image data to an input/output panel 18 (specifically, a display unit 17 thereof) and to a recording device 19.

The input/output panel 18 is made up of an input unit 16 and the display unit 17.

The input unit 16 is constituted, for example, by a device with the function of accepting (sensing) an input entered from the outside, such as a touch panel of electrostatic type, and a set including a light source for emitting light and a sensor for receiving the emitted light after being reflected by an object.

When an external object, e.g., a user's finger or a touch pen handled by a user, is positioned close to or touched on the input unit 16, the input unit 16 supplies a signal representing the proximate position or the touched position on the display unit 16 to a CPU 23.

The display unit 17 is constituted by a device for displaying an image (i.e., a display device), such as a liquid crystal panel, and it displays an image in accordance with, e.g., image data supplied from the digital signal processing unit 15.

In the input/output panel 18, the above-described input unit 16 and display unit 17 are integrated with each other such that the display unit 17 can display an image and the input unit 16 can accept an operating input externally applied to the image displayed on the display unit 17.

For example, the so-called touch screen or the like can be employed as the input/output panel 18.

For example, a disc such as a DVD (Digital Versatile Disc), a semiconductor memory such as a memory card, or another removable recording medium (not shown) can be removably attached to the recording device 19. The recording device 19 executes control for recording or reproducing image data on or from the attached recording medium.

More specifically, the recording device 19 records the image data from the digital signal processing unit 15 on the recording medium, reads image data recorded on the recording medium, and supplies the read image data to the digital signal processing unit 15.

Actuators 20 are motors for adjusting the focusing lens and the diaphragm in the lens unit 11 and are driven by a motor drive 21.

The motor drive 21 drives the actuators 20 in accordance with control of a CPU (Central Processing Unit) 23.

A TG (Timing Generator) 22 supplies a timing signal for use in control of an exposure time, etc. to the imaging device 12 in accordance with control of the CPU 23.

The CPU 23 executes programs stored in a program ROM (Read Only Memory) 26 and, where necessary, programs stored in an EEPROM (Electrically Erasable Programmable ROM) 25, thereby controlling various blocks of the digital camera.

An operating unit 24 is constituted by, e.g., physical buttons operated by the user, and it supplies a signal corresponding to a user's operation to the CPU 23.

The EEPROM 25 stores data and programs that are to be held even when power of the digital camera is turned off, such as shooting parameters set by the user operating the operating unit 24, etc.

The program ROM 26 stores, for example, programs executed by the CPU 23.

A RAM 27 temporarily stores data and programs, which are necessary in the operation of the CPU 23.

In the digital camera constituted as described above, the CPU 23 executes the programs recorded on the program ROM 26, thereby controlling various units or portions of the digital camera.

Meanwhile, the light incident on the lens unit 11 is photoelectrically converted in the imaging device 12 and a resulting image signal is supplied to the analog signal processing unit 13. The analog signal processing unit 13 executes the analog signal processing on the image signal from the imaging device 12 and supplies the processed image signal to the A/D conversion unit 14.

The A/D conversion unit 14 executes the A/D conversion on the image signal from the analog signal processing unit 13 and supplies resulting digital image data to the digital signal processing unit 15.

The digital signal processing unit 15 executes the digital signal processing on the image data from the A/D conversion unit 14 and supplies resulting image data to the input/output panel 18 (specifically, the display unit 17 thereof) in which a corresponding image, i.e., the so-called through-the-lens image, is displayed.

Further, the CPU 23 executes predetermined processes in accordance with signals from the input/output panel 18 (specifically, the input unit 16 thereof) and the operating unit 24.

In more detail, for example, when the input/output panel 18 or the operating unit 24 is operated to take an image, the CPU 23 controls the digital signal processing unit 15 such that the image data from the A/D conversion unit 14 is subjected to the compression coding process and is recorded on the recording medium through the recording device 19.

Also, for example, when the input/output panel 18 or the operating unit 24 is operated to reproduce an image, the CPU 23 controls the digital signal processing unit 15 such that image data is read from the recording medium through the recording device 19.

Further, the CPU 23 instructs the digital signal processing unit 15 to decompress the image data read from the recording medium and to supply the decompressed image data to the input/output panel 18 for display thereon.

In addition, the CPU 23 instructs the digital signal processing unit 15 to generate an image of a focus frame (AF frame) for use in focus control and to display the focus frame on the input/output panel 18.

The digital camera has, e.g., the AF (Auto Focus) function, the AE (Auto Exposure) function, the AWB (Auto White Balance) function, etc. These functions are realized with the CPU 23 executing the corresponding programs.

For example, display of the AF frame on the input/output panel 18 is executed by the AF function. The position of the AF frame displayed on the input/output panel (specifically, a display screen of the display unit 17 thereof) can be moved by an operation that is made on the input/output panel 18 to instruct movement of the position of the AF frame. Further, the size of the AF frame displayed on the input/output panel 18 (specifically, the display screen of the display unit 17 thereof) can be changed by an operation that is made on the input/output panel 18 to instruct change in the size of the AF frame.

The program to be executed by the CPU 23 can be installed, for example, into the digital camera from the removable recording medium, or into the digital camera by downloading it via a network.

Figure 2B:
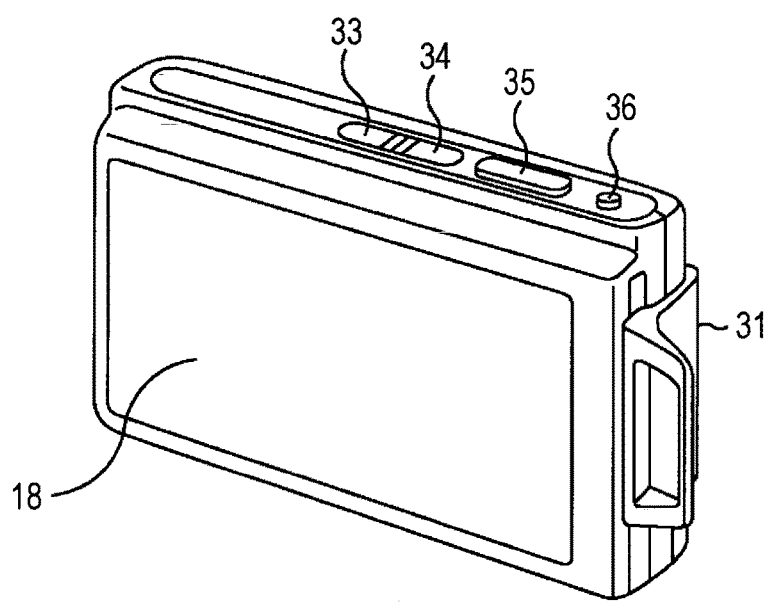

FIGS. 2A and 2B are perspective views illustrating an example of external configuration of the digital camera illustrated in FIG. 1.

Specifically, FIG. 2A is a perspective view looking the front side of the digital camera (i.e., the side of the digital camera, which is directed to a subject when taking an image), and FIG. 2B is a perspective view looking the back side of the digital camera.

A lens cover 31 is disposed to cover a front surface of the digital camera and is movable up and down.

When the lens cover 31 is in the upward moved position, the lens unit 11, etc. are covered with the lens cover 31. Also, when the lens cover 31 is in the downward moved position, the lens unit 11, etc. are exposed and the digital camera is in a state capable of taking an image.

In FIG. 2A, the lens cover 31 is in the downward moved position, and the lens unit 11 is exposed.

An AF illuminator 32 is disposed on the left side of the lens unit 11. For example, when the subject is dark and focusing is difficult to fulfill with the AF function, the AF illuminator 32 emits light (auxiliary light) for illuminating the subject.

The AF illuminator 32 also functions as a self-timer lamp that informs the timing of shooting by a self-timer to the user when an image is taken by using the self-timer.

At the top of the digital camera, there are disposed a power button 33, a reproducing button 34, a shutter button (release button) 35, and a zoom lever 36, which are components of the operating unit 24 illustrated in FIG. 1.

The power button 33 is operated to switch turning-on and -off of a power supply for the digital camera, and the reproducing button 34 is operated to reproduce the image data recorded on the recording medium that is attached to the recording device 19 (FIG. 1).

The shutter button (release button) 35 is operated to record image data on the recording medium that is attached to the recording device 19 (FIG. 1), and a zoom lever 36 is operated to control zooming.

The input/output panel 18 is disposed on the backside of the digital camera. An image, such as a through-the-lens image, is displayed on the input/output panel 18. Further, the user can give various (operating) inputs to the digital camera by positioning or touching the user's finger or a touch pen close to or on the input/output panel 18.

[Example of Configuration of Display Control Device]

FIG. 3 is a block diagram illustrating an example of functional configuration of a display control device, constituted as the CPU 23 in FIG. 1, which executes display control.

Here, in the digital camera of FIG. 1, when the input/output panel 18 or the operating unit 24 is operated to reproduce an image recorded on the recording medium that is attached to the recording device 19, the CPU 23 controls the digital signal processing unit 15 and executes display control for displaying the image recorded on the recording medium, which is attached to the recording device 19, on the input/output panel 18 (specifically the display unit 17 thereof).

FIG. 3 illustrates an example of the functional configuration of the display control device, constituted as the CPU 23, which executes the above-described display control.

The display control device includes an input detecting unit 51, an enlarged-image generating unit 52, and a display control unit 53.

A signal (hereinafter referred to also as a "stimulus signal") depending on a stimulus (input), which is externally applied to the input/output panel 18 (specifically, the input unit 16 thereof), is supplied to the input detecting unit 51 from the input/output panel 18 (specifically, the input unit 16 thereof).

In accordance with the stimulus signal from the input/output panel 18 (specifically, the input unit 16 thereof), the input detecting unit 51 detects the input externally applied to the input/output panel 18 (specifically, the input unit 16 thereof), such as the proximity or the touch of, e.g., the user's finger or the touch pen handled by the user, and the position (on the input/output panel 18) where the user's finger or the touch pen is positioned close to or touched on the input unit 16. Further, the input detecting unit 51 supplies the detected input, position, etc., as operating information representing the operation performed by the user on the input/output panel 18, to the enlarged-image generating unit 52 and the display control unit 53.

A display target image to be displayed on the input/output panel 18 (specifically, the display unit 17 thereof) is supplied to the enlarged-image generating unit 52 from the recording medium, which is attached to the recording device 19, through the digital signal processing unit 15.

The enlarged-image generating unit 52 enlarges a partial image, i.e., a part of the display target image supplied to the enlarged-image generating unit 52, in accordance with the operating information from the input detecting unit 51, and it supplies a partial enlarged image obtained with the enlargement of the partial image to the display control unit 53.

The display target image is further supplied to the display control unit 53 from the recording medium, which is attached to the recording device 19, through the digital signal processing unit 15.

The display control unit 53 executes display control to adjust the size of the display target image supplied to the display control unit 53 and to display the whole or a part of the display target image after the size adjustment on the input/output panel 18 (specifically, the display unit 17 thereof) through the digital signal processing unit 15.

Further, the display control unit 53 executes display control to display the partial enlarged image from the enlarged-image generating unit 52 on the input/output panel 18 (specifically, the display unit 17 thereof) through the digital signal processing unit 15 in accordance with the operating information from the input detecting unit 51.

Here, as image-taking modes of taking an image, the digital camera has, for example, an ordinary image-taking mode of taking an image (hereinafter referred to as an "ordinary image") at substantially the same aspect ratio as that of the display screen of the display unit 17 of the input/output panel 18, and a panorama mode of taking a panorama image.

In the panorama mode, for example, when the user pans the digital camera while pressing the shutter button 35, a plurality of images are successively taken during a period in which the shutter button 35 is pressed. Further, in the digital signal processing unit 15, the plural images are combined with each other such that they are arrayed with positional alignment side by side in a direction in which the digital camera has been panned, thereby generating a horizontally long panorama image that is obtained as if the range over which the digital camera has been panned during the pressing period of the shutter button 35 is photographed at a time.

The taking (generation) of the panorama image can also be performed by tilting the digital camera instead of panning the digital camera. When the panorama image is taken by tilting the digital camera, the panorama image is obtained as a vertically long image.

When the display target image is the ordinary image, the display control unit 53 adjusts the size of the ordinary image, i.e., the display target image, to be matched with the size of the display screen of the display unit 17 and displays the ordinary image after the size adjustment on the display unit 17 of the input/output panel 18.

Because the aspect ratio of the ordinary image is the same as that of the display screen, the whole of the ordinary image is displayed over the entire display screen.

On the other hand, when the display target image is the panorama image, the aspect ratio of the panorama image differs from that of the display screen. Namely, the panorama image is, for example, horizontally longer than the display screen. Therefore, it is practically hard to display the whole of the panorama image on the entire display screen while maintaining the aspect ratio of the panorama image.

Stated another way, for example, when the horizontally long panorama image is to be displayed on a display screen having an aspect ratio differing from that of the panorama image while the aspect ratio of the panorama image is maintained, the whole of the panorama image is displayed by adjusting the (horizontal or vertical) size of the panorama image such that the horizontal size of the horizontally long panorama image, i.e., the size of the horizontally long panorama image in its lengthwise direction corresponding to longer one of horizontal and vertical sides thereof, is (substantially) matched with the horizontal size of the display screen. Alternatively, a part of the panorama image is displayed by adjusting the size of the panorama image such that the vertical size of the horizontally long panorama image, i.e., the size of the horizontally long panorama image in its widthwise direction corresponding to shorter one of horizontal and vertical sides thereof, is (substantially) matched with the vertical size of the display screen.

Here, a display mode of adjusting the size of the panorama image such that the horizontal (lengthwise) size of the horizontally long panorama image is matched with the horizontal size of the display screen, and then displaying the whole of the panorama image after the size adjustment is called a whole display mode.

Also, a display mode of adjusting the size of the panorama image such that the vertical (widthwise) size of the horizontally long panorama image is matched with the vertical size of the display screen, and then displaying a part of the panorama image after the size adjustment is called a partial display mode.

The partial display mode is divided into an instruction mode in which the user instructs a portion of the panorama image after the size adjustment, which is to be displayed on the display screen, and a scroll mode in which a portion of the panorama image after the size adjustment, which is to be displayed on the display screen, is scrolled in a direction of movement of the digital camera at the time when the panorama image has been taken (e.g., a pan direction corresponding to the lengthwise direction of the panorama image).

In the whole display mode, the horizontal size of the panorama image displayed on the display screen is matched with the horizontal size of the display screen, but the vertical size of the panorama image is smaller than the vertical size of the display screen. Therefore, when the panorama image is displayed on the display screen, a region or regions where the panorama image is not displayed occur in the upper or lower side or in both the upper and lower sides of the display screen, and the panorama image is displayed in a reduced size on the display screen.

On the other hand, in the partial display mode, the panorama image can be displayed in a not-reduced size on the display screen. However, just a part of the panorama image can be displayed on the display screen, and the whole of the panorama image is not displayed in its full size on the display screen.

Accordingly, in this embodiment, the display control unit 53 executes display control to display the whole of the panorama image, i.e., the display target image, on the display screen of the input/output panel 18 (specifically, the display unit 17 thereof) in the whole display mode, and to display a partial enlarged image, i.e., an image obtained by enlarging a partial image corresponding to a part of the display target image and having a smaller size than the display screen, at a position where the partial image is displayed in the whole image, in superimposed relation to the display target image that is displayed in its entirety. Thus, the user can confirm both the whole and the partial details of the panorama image, i.e., the display target image, at the same time.

[Display Examples in Whole Display Mode]

Figure 4A:
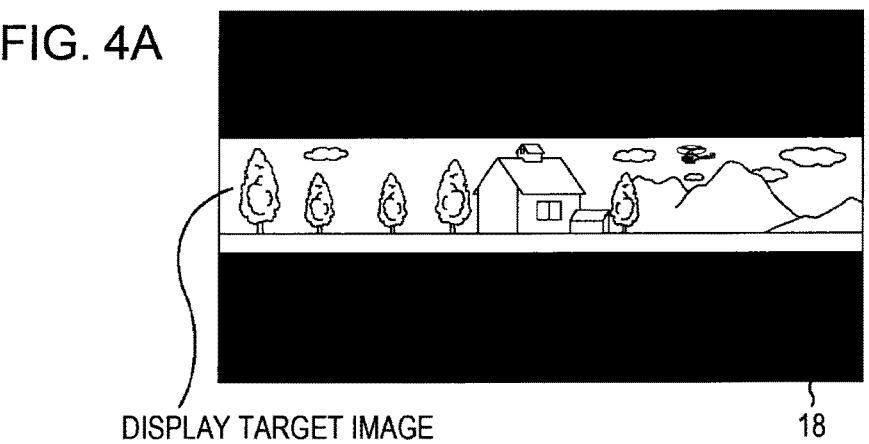
FIGS. 4A, 4B and 4C illustrate display examples of a panorama image in a whole display mode.
Figure 4B:
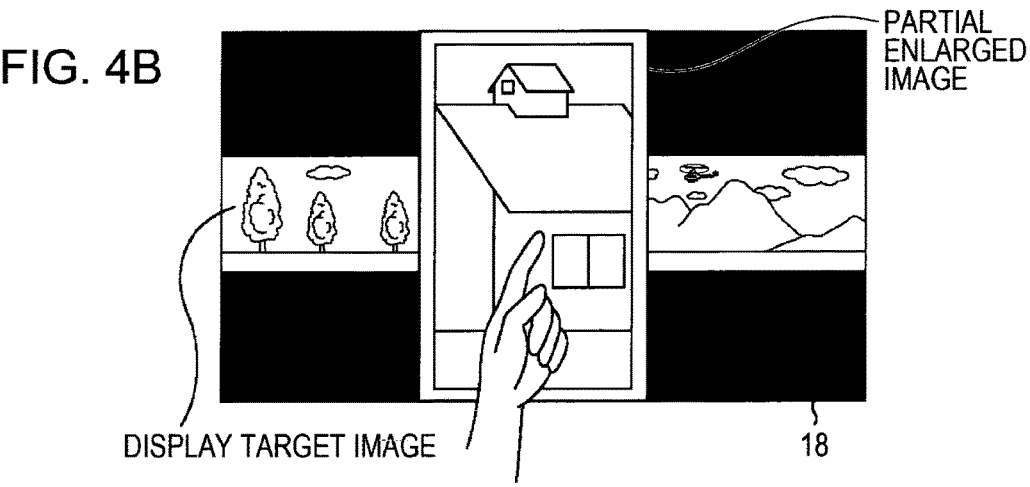
Figure 4C:
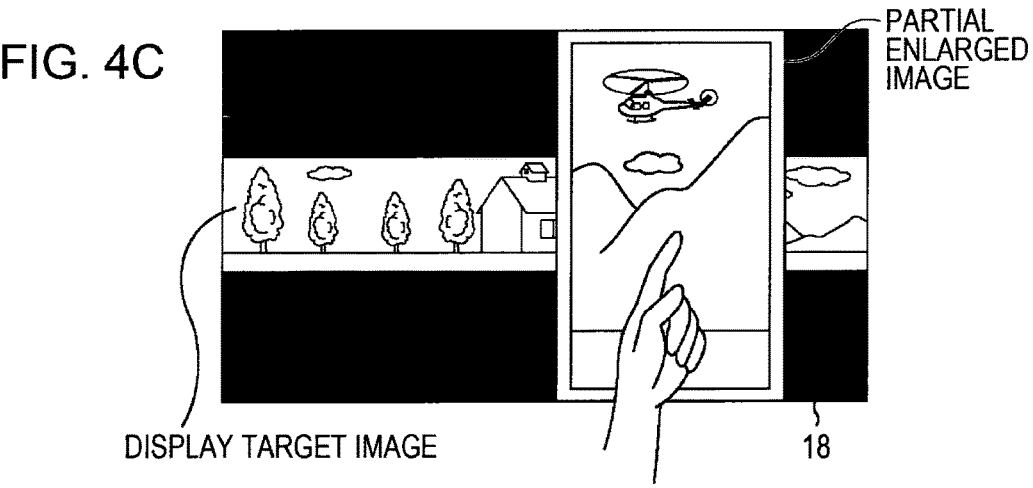

FIGS. 4A, 4B and 4C illustrate display examples of the panorama image in the whole display mode.

FIG. 4A illustrates a display example on the display screen of the input/output panel 18 (specifically, the display unit 17 thereof) in a state where the user's finger is not touched on the input/output panel 18.

In the state where the user's finger is not touched on the input/output panel 18, the display control unit 53 adjusts the size of e.g., a horizontally long panorama image as the display target image such that the lengthwise or horizontal size of the horizontally long panorama image is matched with the horizontal size of the display screen, and then displays the whole of the panorama image.

Here, displaying the whole of the panorama image, as illustrated in FIG. 4A, is also called "whole display".

FIGS. 4B and 4C illustrate display examples on the display screen of the input/output panel 18 in a state where the user's finger is touched on the input/output panel 18.

In FIG. 4B, the user's finger is touched on the display screen of the input/output panel 18 at a substantially central position in the horizontal direction thereof.

In that case, the display control unit 53 executes the whole display of the panorama image as in the case of FIG. 4A.

Further, the enlarged-image generating unit 52 selects, as a partial image to be enlarged, a predetermined range of the panorama image, which is displayed in its entirety, in the horizontal direction (i.e., in the lengthwise direction of the panorama image) with a touched point of the user's finger being a center of the predetermined range, and then enlarges the partial image into a size smaller than that of the display screen. Further, the enlarged-image generating unit 52 supplies a resulting partial enlarged image to the display control unit 53.

The display control unit 53 displays the partial enlarged image supplied from the enlarged-image generating unit 52 at the position on the display screen where the user's finger is touched, i.e., at the position where the partial image is displayed, in superimposed relation to the panorama image that is displayed in its entirety.

In FIG. 4C, the user's finger is touched on the display screen of the input/output panel 18 at a position slightly shifted to the right in the horizontal direction.

In that case, the display control unit 53 also executes the whole display of the panorama image as in the case of FIG. 4B.

Further, the enlarged-image generating unit 52 selects, as a partial image to be enlarged, a predetermined range of the panorama image, which is displayed in its entirety, in the horizontal direction with a touched point of the user's finger being a center of the predetermined range, and then enlarges the partial image. Further, the enlarged-image generating unit 52 supplies a resulting partial enlarged image to the display control unit 53.

The display control unit 53 displays the partial enlarged image supplied from the enlarged-image generating unit 52 at the position on the display screen where the user's finger is touched, i.e., at the position where the partial image is displayed, in superimposed relation to the panorama image that is displayed in its entirety.

Thus, when the user touches the finger on the display screen, on which the whole of the panorama image is displayed, substantially at the central position in the lengthwise direction thereof as illustrated in FIG. 4B, a partial enlarged image obtained by enlarging the image (partial image) in the predetermined range of the panorama image, which is displayed in its entirety, in the horizontal direction with the touched point of the user's finger being substantially the center of the predetermined range is displayed at the touched position of the user's finger in superimposed relation to the panorama image that is displayed in its entirety.

Further, for example, when the user horizontally moves the finger while keeping the finger in the state touched on the input/output panel 18, a partial enlarged image obtained by enlarging a partial image in a predetermined range of the panorama image, which is displayed in its entirety, in the horizontal direction with the position of the moving finger being substantially a center of the predetermined range is displayed following the movement of the finger in superimposed relation to the panorama image that is displayed in its entirety.

As described above, since, in addition the whole display of the panorama image, the partial enlarged image corresponding to a part of the panorama image displayed in its entirety is also displayed, the user can confirm both the whole and the partial details of the panorama image at the same time.

Further, since the partial enlarged image obtained by enlarging the partial image is displayed in superimposed relation to the panorama image, which is displayed in its entirety, at the position of the partial image in the panorama image, the user can easily grasp the position of the subject, which appears in the partial enlarged image, with respect to the entire panorama image.

Moreover, just by touching a part of the panorama image displayed in its entirety, for which details are to be confirmed, the user can confirm the details of that part.

In other words, an intuitively recognizable and unique interface can be provided in such a point that when the user touches the finger at an arbitrary position on the panorama image displayed in its entirety, the partial enlarged image corresponding to the touched point is displayed at the touched position, and that when the user moves the finger while the finger is kept touched on the panorama image, the partial enlarged image including the subject appearing at the finger position is also moved following the movement of the finger.

The display of the partial enlarged image can also be performed by, instead of touching the panorama image displayed in its entirety on the display screen, touching a portion of the display screen displaying the panorama image, in which the panorama image is not displayed.

In more detail, because the vertical (widthwise) size of the horizontally long panorama image is smaller than the vertical size of the display screen, the panorama image is displayed at the central position of the display screen in the vertical direction as illustrated in FIG. 4A, for example, in the whole display of that type of panorama image, and the so-called black belts are displayed in portions of the display screen above and under the panorama image.

The partial enlarged image can be displayed not only when the user touches the panorama image displayed on the display screen, but also when the user touches one of the black belts displayed on the display screen.

Stated another way, regardless of which position on the display screen is touched by the user, the partial enlarged image can be displayed by setting, as the partial image to be enlarged to the partial enlarged image, a part of the panorama image, which has coordinates in the lengthwise direction within a predetermined range from the touched position on the display screen.

Moreover, the display of the partial enlarged image can also be performed when the user's finger, the touch pen, or the like is positioned close to the display screen, instead of when it is touched on the display screen.

Thus, when the touch on and the proximity to the display screen can be detected in the input/output panel 18, the touch on and the proximity to the display screen can be each employed as a trigger for displaying the partial enlarged image. As an alternative, the proximity to the display screen may be employed as a trigger for displaying the partial enlarged image, and the touch on the display screen may be employed as a trigger for executing another process.

Figure 5A:
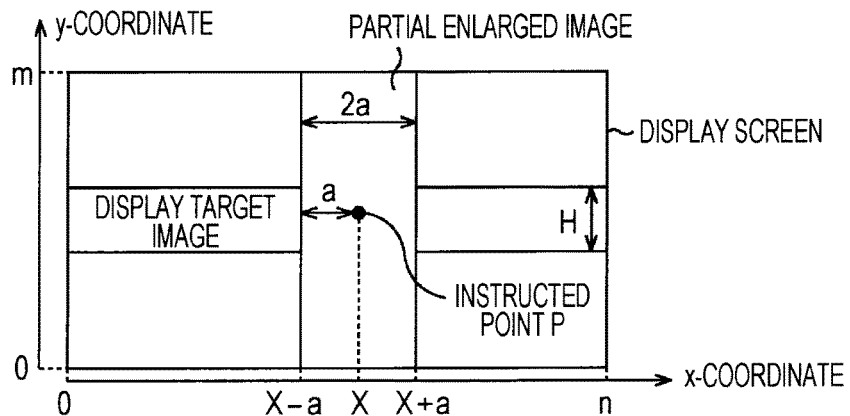
FIGS. 5A, 5B and 5C are illustrations to explain respective display examples of the panorama image in the whole display mode and a partial enlarged image.
Figure 5B:
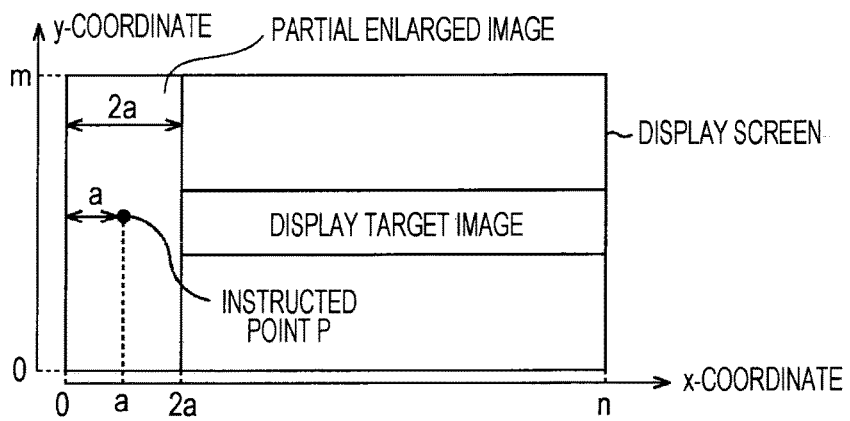
Figure 5C:
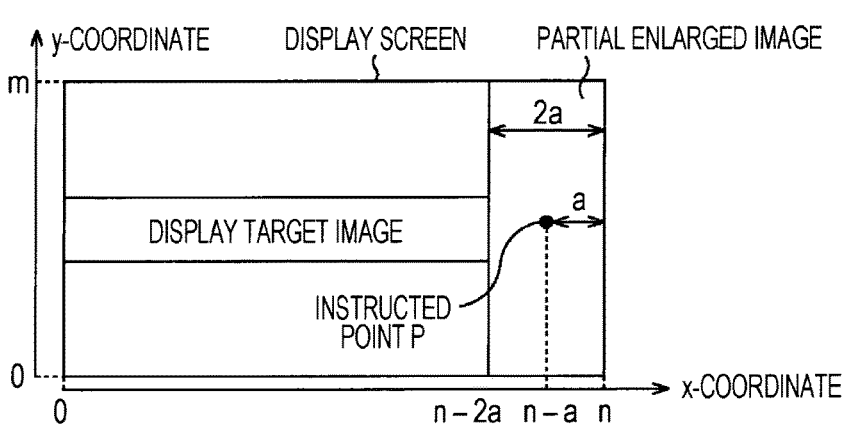

FIGS. 5A, 5B and 5C present illustrations to explain respective display examples of the panorama image in the whole display mode and the partial enlarged image.

In the whole display mode, as described above with reference to FIGS. 3 and 4A to 4C, the display control unit 53 executes the whole display of adjusting the size of the panorama image, i.e., the display target image, such that the horizontal (lengthwise) size of the horizontally long panorama image, for example, is matched with the horizontal size of the display screen, and then displaying the whole of the panorama image after the size adjustment at the central position of the display screen in the widthwise direction thereof.

Accordingly, the horizontally long panorama image as the display target image is displayed in such a size that the horizontal ends of the horizontally long panorama image in the lengthwise direction thereof are aligned with corresponding ends of the display screen.

Here, the size of the horizontally long panorama image, which is displayed in its entirety, in the vertical direction, i.e., in the widthwise direction thereof, is denoted by H.

Further, the size of the display screen in the horizontal direction, i.e., in the lengthwise direction of the horizontally long panorama image as the display target image, is denoted by n, and the size of the display screen in the vertical direction, i.e., in the widthwise direction of the horizontally long panorama image as the display target image, is denoted by m.

Moreover, in a two-dimensional coordinate system defined by the origin set at a lower left corner point of the display screen and two axes, which are set as an x-axis representing the horizontal direction, i.e., the lengthwise direction of the horizontally long panorama image as the display target image displayed on the display screen and a y-axis representing the vertical direction, i.e., the widthwise direction of the horizontally long panorama image, an x-coordinate (coordinate in the lengthwise direction of the display target image) of an instructed point P where the user's finger, for example, is touched on (or positioned close to) the display screen is denoted by X.

Still further, a positive value of which doubled value is smaller than the size n of the display screen in the lengthwise direction of the panorama image (in the x-direction in FIGS. 5A to 5C) as the display target image is denoted by "a".

In that case, in the display control device of FIG. 3, the enlarged-image generating unit 52 recognizes the x-coordinate X of the instructed point P based on the operating information from the input detecting unit 51, selects, as a partial image to be enlarged to the partial enlarged image, an x-coordinate range of X−a×H/m to X+a×H/m of the panorama image, i.e., the display target image, which is displayed in its entirety, and then enlarges that partial image to the partial enlarged image having a size of 2a (in the horizontal (lengthwise) direction)×m (in the vertical (widthwise) direction).

Stated another way, the enlarged-image generating unit 52 generates the partial enlarged image having the size of 2a×m by enlarging (horizontal and vertical) sizes of the partial image m/H times such that the size of the partial enlarged image in the vertical direction thereof (i.e., in the widthwise direction of the display target image) is matched with the size m of the display screen in the vertical direction thereof (i.e., in the widthwise direction of the display target image).

The partial enlarged image is supplied from the enlarged-image generating unit 52 to the display control unit 53, and the display control unit 53 displays (the whole of) the partial enlarged image having the size of 2a×m, which is supplied from the enlarged-image generating unit 52, on the display screen over the (entire) range of X−a to X+a in terms of x-coordinate (coordinate in the lengthwise direction) thereof.

Here, since the vertical (y-directional) size of the partial enlarged image is equal to the vertical size m of the display screen, the partial enlarged image is displayed in the vertical direction over the range of 0 to m in terms of y-coordinate of the display screen.

Thus, when the partial enlarged image obtained by enlarging an x-coordinate range of X−a×H/m to X+a×H/m of the panorama image, i.e., the display target image, which is displayed in its entirety, and having the size of 2a×m is displayed over the range of X−a to X+a in terms of x-coordinate, the whole of the partial enlarged image having the size of 2a×m can be displayed on the display screen on condition that the x-coordinate X of the instructed point P is not smaller than "a" and not larger than n−a.

When the x-coordinate X of the instructed point P is smaller than "a", the partial enlarged image having the size of 2a×m is displayed on the display screen in a state that the partial enlarged image is partly lacked on the left side thereof.

Also, when the x-coordinate X of the instructed point P is larger than n−a, the partial enlarged image having the size of 2a×m is displayed on the display screen in a state that the partial enlarged image is partly lacked on the right side thereof.

In view of the above point, when the x-coordinate X of the instructed point P is larger than "a" and smaller than n−a, the display control unit 53 displays, as described above, the partial enlarged image having the size of 2a×m on the display screen over the range of X−a to X+a in terms of x-coordinate thereof. On the other hand, when the x-coordinate X of the instructed point P is not larger than "a", the display control unit 53 displays the partial enlarged image having the size of 2a×m on the display screen over the range of 0 to 2a in terms of x-coordinate thereof. Further, when the x-coordinate X of the instructed point P is not smaller than n−a, the display control unit 53 displays the partial enlarged image having the size of 2a×m on the display screen over the range of n−2a to n in terms of x-coordinate thereof.

FIG. 5A illustrates a situation in which the x-coordinate X of the instructed point P is larger than "a" and smaller than n−a, and the partial enlarged image having the size of 2a×m is displayed on the display screen over the range of X−a to X+a in terms of x-coordinate thereof.

FIG. 5B illustrates a situation in which the x-coordinate X of the instructed point P is not larger than "a" and the partial enlarged image having the size of 2a×m is displayed on the display screen over the range of 0 to 2a in terms of x-coordinate thereof.

Further, FIG. 5C illustrates a situation in which the x-coordinate X of the instructed point P is not smaller than n−a and the partial enlarged image having the size of 2a×m is displayed on the display screen over the range of n−2a to n in terms of x-coordinate thereof.

Thus, the partial enlarged image can be avoided from being displayed in the state partly lacked on the left or right side thereof, by displaying the partial enlarged image having the size of 2a×m on the display screen over the range of X−a to X+a in terms of x-coordinate thereof when the x-coordinate X of the instructed point P is larger than "a" and smaller than n−a, by displaying it on the display screen over the range of 0 to 2a in terms of x-coordinate thereof when the x-coordinate X of the instructed point P is not larger than "a", and by displaying it on the display screen over the range of n−2a to n in terms of x-coordinate thereof when the x-coordinate X of the instructed point P is not smaller than n−a.

As described above, the enlarged-image generating unit 52 recognizes the x-coordinate X of the instructed point P based on the operating information from the input detecting unit 51, selects, as a partial image to be enlarged to the partial enlarged image, an x-coordinate range of X−a×H/m to X+a×H/m of the panorama image, i.e., the display target image, which is displayed in its entirety, and then enlarges that partial image to the partial enlarged image having a size of 2a×m. In that case, however, when the x-coordinate X of the instructed point P is smaller than a×H/m or larger than n−a×H/m, the x-coordinate-range from X−a×H/m to X+a×H/m defining the partial image extends off the left or right edge of the panorama image, i.e., the display target image, which is displayed in its entirety.

When the x-coordinate range of X−a×H/m to X+a×H/m defining the partial image extends off the left or right edge of the panorama image, i.e., the display target image, which is displayed in its entirety, the left or right side of the partial enlarged image obtained by enlarging the partial image to the size of 2a×m is partly displayed blank.

In view of the above point, when the x-coordinate X of the instructed point P is not larger than a×H/m, the enlarged-image generating unit 52 modifies the relevant x-coordinate X to a×H/m, and when the x-coordinate X of the instructed point P is not smaller than n−a×H/m, the enlarged-image generating unit 52 modifies the relevant x-coordinate X to n−a×H/m.

After modifying the x-coordinate X of the instructed point P, the enlarged-image generating unit 52 selects based on the modified x-coordinate X, as a partial image to be enlarged to the partial enlarged image, an x-coordinate range of X−a× H/m to X+a×H/m of the panorama image, i.e., the display target image, which is displayed in its entirety, and then enlarges that partial image to the partial enlarged image having a size of 2a×m.

By modifying the x-coordinate X of the instructed point P as described above, it is possible to avoid the x-coordinates defining the partial image from extending off to the left side or the right side, and hence to avoid a blank area from being partly displayed in the left side or the right side of the partial enlarged image, which is obtained by enlarging the partial image to the size of 2a×m.

Display control including the above-described modification of the x-coordinate X of the instructed point P is executed as follows. The partial enlarged image (specifically, the subject appearing thereon) is changed depending on the finger position, i.e., the x-coordinate X of the instructed point P, while the finger touched on the display screen is moved within the range where the x-coordinate X of the instructed point P is larger than a×H/m and smaller than n−a×H/m.

Stated another way, on the display screen of the input/output panel 18, the partial enlarged image obtained by enlarging an x-coordinate range of X−a×H/m to X+a×H/m of the panorama image, i.e., the display target image, which is displayed in its entirety, is displayed depending on the x-coordinate X of the instructed point P.

When the finger touched on the display screen is moved to, e.g., the left and the x-coordinate X of the instructed point P reaches a×H/m, the partial enlarged image obtained by enlarging the x-coordinate range of X−a×H/m to X+a×H/m, namely an x-coordinate range of 0 to 2×a×H/m, of the panorama image, i.e., the display target image, which is displayed in its entirety, is displayed. Thereafter, even when the finger is further moved to the left, the partial enlarged image obtained by enlarging the x-coordinate range of 0 to 2×a×H/m of the panorama image, i.e., the display target image, which is displayed in its entirety, is continuously displayed.

On the other hand, when the finger touched on the display screen is moved to, e.g., the right and the x-coordinate X of the instructed point P reaches n−a×H/m, the partial enlarged image obtained by enlarging the x-coordinate range of X−a×H/m to X+a×H/m, namely an x-coordinate range of n−2×a×R/m to n, of the panorama image, i.e., the display target image, which is displayed in its entirety, is displayed. Thereafter, even when the finger is further moved to the right, the partial enlarged image obtained by enlarging the x-coordinate range of n−2×a×H/m to n of the panorama image, i.e., the display target image, which is displayed in its entirety, is continuously displayed.

In FIGS. 5A to 5C, the partial enlarged image is generated by enlarging m/H times the partial image that provided as the x-coordinate range of X−a×H/m to X+a×H/m of the panorama image, i.e., the display target image, which is displayed in its entirety. However, a magnification in enlarging the partial image can be set to some other suitable value, for example, in accordance with a user operation.

If a value larger than m/H is used as the magnification in enlarging the partial image, the whole of the partial enlarged image obtained by enlarging the partial image is not displayed in its full size on the display screen.

If a value larger than m/H is used as the magnification in enlarging the partial image, it is difficult to display the whole of the partial enlarged image obtained by enlarging the partial image in its full size on the display screen.

The horizontal size 2a of the partial enlarged image (i.e., the size 2a of the partial enlarged image in the lengthwise direction of the display target image) (or the positive integer "a") can be set to a positive value smaller than the horizontal size of the display screen in advance or in accordance with a user operation, for example.

[Display Control Process in Whole Display Mode]

Figure 6:
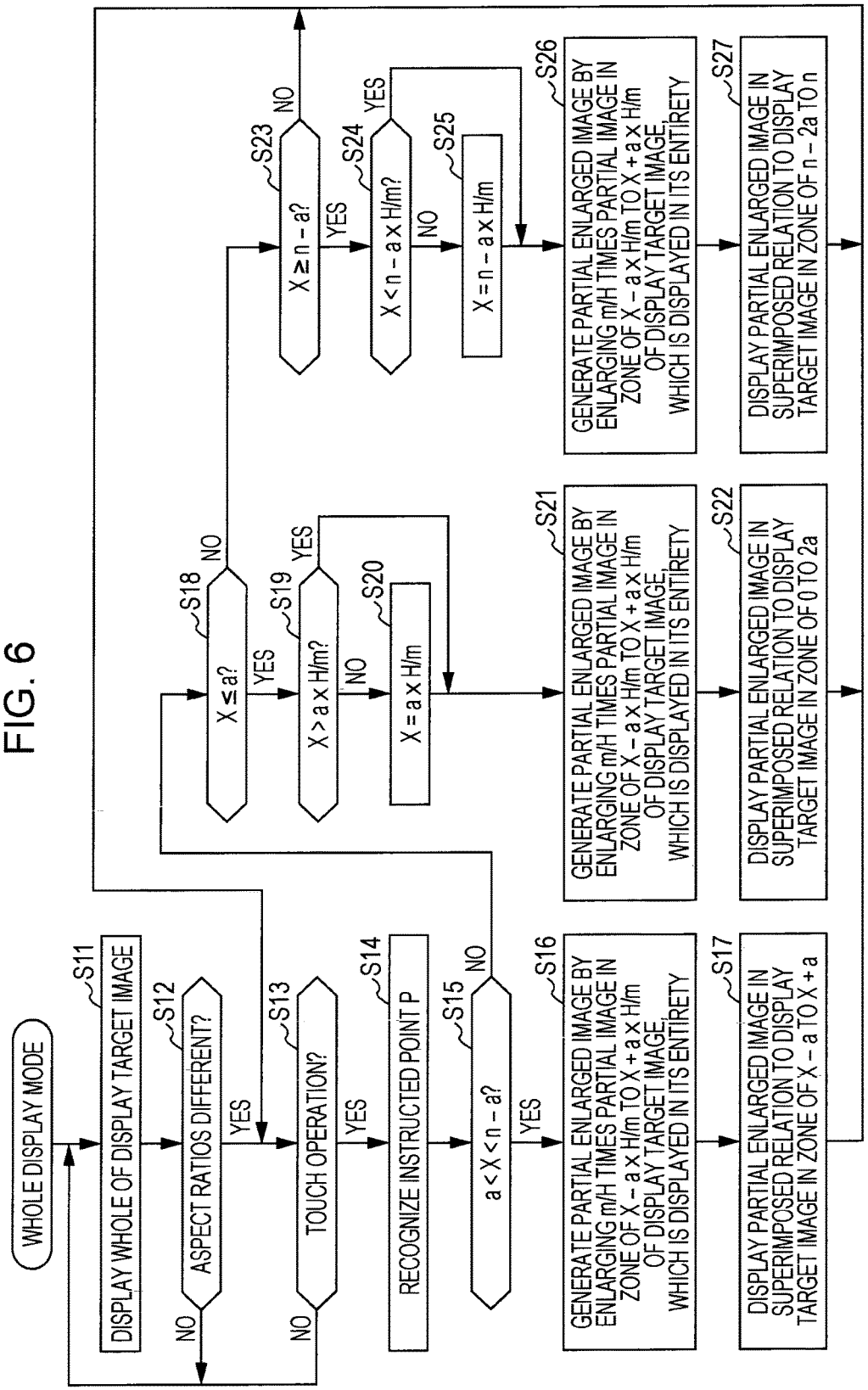
FIG. 6 is a flowchart to explain a display control process executed by the display control device in the whole display mode.

FIG. 6 is a flowchart to explain a display control process executed by the display control device, illustrated in FIG. 3, in the whole display mode.

In step S11, the display control unit 53 executes the whole display of adjusting the size of the display target image such that the lengthwise size of the display target image is matched with the size of the display screen in the lengthwise direction of the display target image, and then displaying the whole of the display target image after the size adjustment on the display screen of the input/output panel 18. Thereafter, the processing advances to step S12.

In step S12, the display control unit 53 determines whether the aspect ratio of the display target image differs from the aspect ratio of the display screen of the input/output panel 18.

If it is determined in step S12 that the aspect ratio of the display target image does not differ from the aspect ratio of the display screen of the input/output panel 18, i.e., if the aspect ratio of the display target image is (substantially) equal to the aspect ratio of the display screen of the input/output panel 18, the processing returns to step S11. Thereafter, the processing is repeated in a similar manner to that described above.

If it is determined in step S12 that the aspect ratio of the display target image differs from that of the display screen of the input/output panel 18, i.e., if the aspect ratio of the display screen of the input/output panel 18 is 4:3 or 16:9 and the display target image is a panorama image having a horizontal size longer than that of the display screen, the processing advances to step S13 in which the enlarged-image generating unit 52 determines, based on the operating information supplied from the input detecting unit 51, whether a touch is made on the display screen of the input/output panel 18.

If it is determined in step S13 that a touch is not made on the display screen of the input/output panel 18, the processing returns to step S11.

If it is determined in step S13 that a touch is made on the display screen of the input/output panel 18, i.e., if the input detecting unit 51 detects a touch on the display screen of the input/output panel 18, the processing advances to step S14 in which the enlarged-image generating unit 52 and the display control unit 53 recognize the instructed point P, i.e., the position (point) on the display screen where the touch is made, based on the operating information supplied from the input detecting unit 51. Thereafter, the processing advances to step S15.

For simplicity of explanation, it is here supposed that, in FIG. 6, the display target image is, e.g., a horizontally long panorama image.

In step S15, the enlarged-image generating unit 52 and the display control unit 53 determine whether the x-coordinate X of the instructed point P (namely, the coordinate thereof in the lengthwise direction of the horizontally long panorama image as the display target image) is larger than "a" and smaller than n−a.

If it is determined in step S15 that the x-coordinate X of the instructed point P is larger than "a" and smaller than n−a, the processing advances to step S16. In step S16, the enlarged-image generating unit 52 selects, as a partial image to be enlarged to the partial enlarged image, an x-coordinate (lengthwise coordinate) range of X−a×H/m to X+a×H/m of the panorama image, i.e., the display target image, which is displayed in its entirety, and then enlarges that partial image to the partial enlarged image having a size of 2a×m.

After the enlarged-image generating unit 52 supplies the partial enlarged image to the display control unit 53, the processing advances from step S16 to step S17.

In step S17, the display control unit 53 displays the partial enlarged image, which has the size of 2a×m and is supplied from the enlarged-image generating unit 52, on the display screen over an x-coordinate (lengthwise coordinate) range of X−a to X+a in superimposed relation to the display target image (through overwrite, for example). Thereafter, the processing returns to step S13.

If it is determined in step S15 that the x-coordinate X of the instructed point P is not larger than "a" or not smaller than n−a, the processing advances to step S18 in which the enlarged-image generating unit 52 and the display control unit 53 determine whether the x-coordinate X of the instructed point P is not larger than "a".

If it is determined in step S18 that the x-coordinate X of the instructed point P is not larger than "a", the processing advances to step S19 in which the enlarged-image generating unit 52 determines whether the x-coordinate X of the instructed point P is larger than a×H/m.

If it is determined in step S19 that the x-coordinate X of the instructed point P is not larger than a×H/m, the processing advances to step S20 in which the enlarged-image generating unit 52 modifies the x-coordinate X of the instructed point P to a×H/m. Thereafter, the processing advances to step S21.

If it is determined in step S19 that the x-coordinate X of the instructed point P is larger than a×H/m, the processing skips step S20 and advances to step S21. In step S21, the enlarged-image generating unit 52 selects, as a partial image to be enlarged to the partial enlarged image, an x-coordinate range of X−a×H/m to X+a×H/m of the panorama image, i.e., the display target image, which is displayed in its entirety, and then enlarges that partial image to the partial enlarged image having a size of 2a×m.

After the enlarged-image generating unit 52 supplies the partial enlarged image to the display control unit 53, the processing advances from step S21 to step S22.

In step S22, the display control unit 53 displays the partial enlarged image, which has the size of 2a×m and is supplied from the enlarged-image generating unit 52, on the display screen over an x-coordinate range of 0 to 2a in superimposed relation to the display target image. Thereafter, the processing returns to step S13.

On the other hand, if it is determined in step S18 that the x-coordinate X of the instructed point P is larger than "a", the processing advances to step S23 in which the enlarged-image generating unit 52 and the display control unit 53 determine whether the x-coordinate X of the instructed point P is not smaller than n−a.

If it is determined in step S23 that the x-coordinate X of the instructed point P is smaller than n−a, the processing returns to step S13.

If it is determined in step S23 that the x-coordinate X of the instructed point P is not smaller than n−a, the processing advances to step S24 in which the enlarged-image generating unit 52 determines whether the x-coordinate X of the instructed point P is smaller than n−a×H/m.

If it is determined in step S24 that the x-coordinate X of the instructed point P is not smaller than n−a×H/m, the processing advances to step S25 in which the enlarged-image generating unit 52 modifies the x-coordinate X of the instructed point P to n−a×H/m. Thereafter, the processing advances to step S26.

If it is determined in step S24 that the x-coordinate X of the instructed point P is smaller than n−a×H/m, the processing skips step S25 and advances to step S26. In step S26, the enlarged-image generating unit 52 selects, as a partial image to be enlarged to the partial enlarged image, an x-coordinate range of X−a×H/m to X+a×H/m of the panorama image, i.e., the display target image, which is displayed in its entirety, and then enlarges that partial image to the partial enlarged image having a size of 2a×m.

After the enlarged-image generating unit 52 supplies the partial enlarged image to the display control unit 53, the processing advances from step S26 to step S27.

In step S27, the display control unit 53 displays the partial enlarged image, which has the size of 2a×m and is supplied from the enlarged-image generating unit 52, on the display screen over an x-coordinate range of n−2a to n in superimposed relation to the display target image. Thereafter, the processing returns to step S13.

Other Display Examples

As described above, when the input/output panel 18 is designed such that proximity to the display screen can also be detected in addition to a touch on the display screen, the display control device (FIG. 3) can utilize the detection of the proximity to the display screen as a trigger for displaying the partial enlarged image and the detection of the touch on the display screen as a trigger for executing some other process.

For example, the display control device (FIG. 3) can utilize the detection of the proximity to the display screen as a trigger for displaying the partial enlarged image and the detection of the touch on the display screen as a trigger for executing scroll display.

A scroll mode for executing the scroll display is now described.

Figure 7:
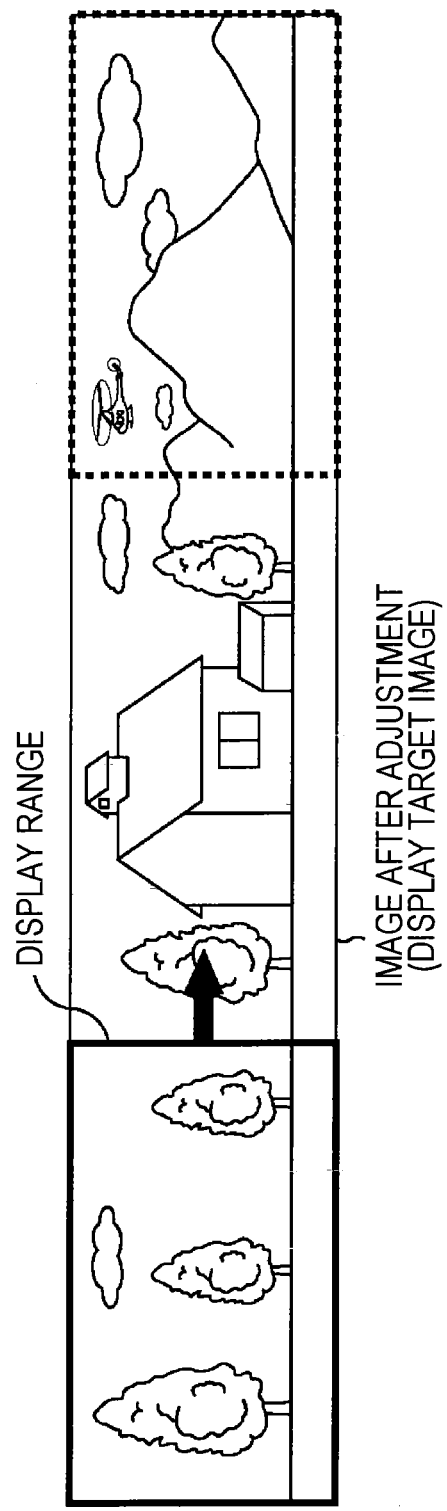
FIG. 7 illustrates a display example of a display target image in a scroll mode.

FIG. 7 illustrates a display example of the display target image in the scroll mode, namely an example of the scroll display for displaying the display target image while scrolling it.

In the scroll mode, the display control unit 53 (FIG. 3) adjusts the size of the display target image such that the vertical (widthwise) size of the display target image, e.g., a horizontally long panorama image, is matched with the vertical size of the display screen. Further, the display control unit 53 gradually moves a display range of the display target image after the size adjustment (hereinafter referred to also as the "image after the adjustment"), which is to be displayed on the display screen, in the same direction as that of movement of the digital camera at the time when the panorama image as the display target image has been taken.

When the panorama image as the display target image has been taken with the digital camera being panned from the left to the right, for example, the displayed range is gradually moved from a start point at the left end of the image after the adjustment to an end point at the right end thereof.

As a result, the image after the adjustment is displayed on the display screen while it is scrolled to the right from the head (left end in the illustrated example).

Thus, in the scroll mode, scrolling of the image after the adjustment (i.e., the display target image) is started from the head (left end in the illustrated example) of the image after the adjustment.

When the proximity to the display screen is regarded as a trigger for displaying the partial enlarged image and the touch on the display screen is regarded as a trigger for executing the scroll display, the display control unit 53 (FIG. 3) can start the scrolling from not only the head of the image after the adjustment as described above, but also from the touched position.

Figure 8B:
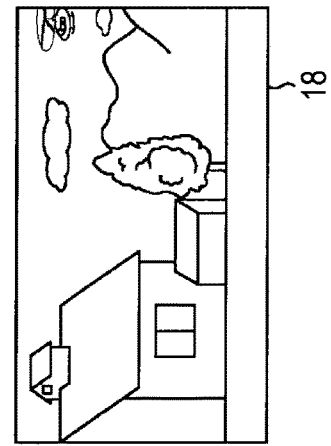
FIGS. 8A, 8B and 8C illustrate a display example on a display screen when proximity to the display screen is regarded as a trigger for displaying a partial enlarged image and a touch on the display screen is regarded as a trigger for displaying an image in the scroll mode.
Figure 8A:
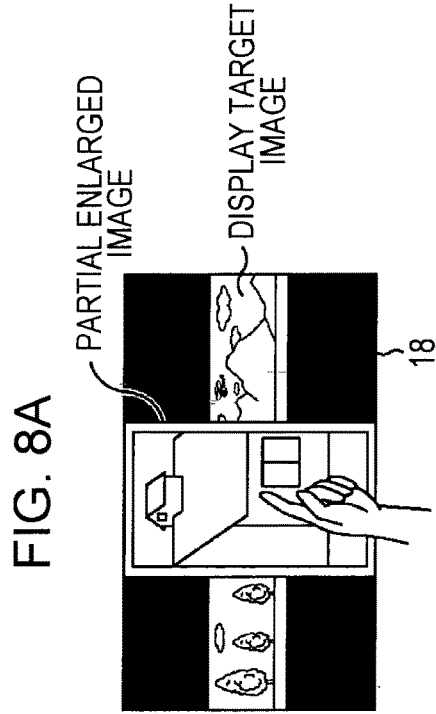
Figure 8C:
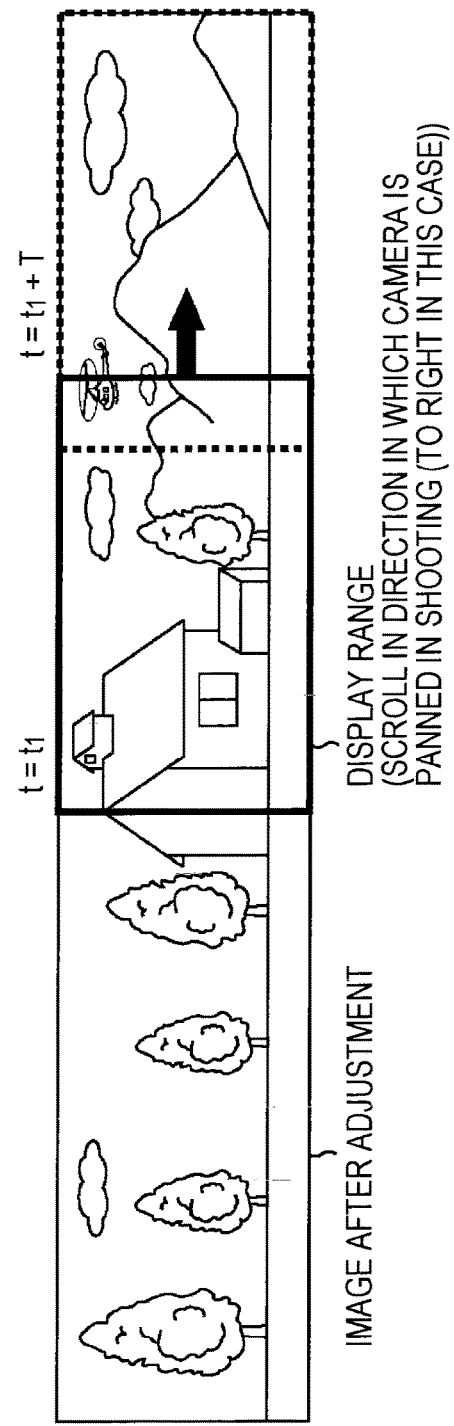

FIGS. 8A, 8B and 8C illustrate a display example on the display screen when the proximity to the display screen is regarded as the trigger for displaying the partial enlarged image and the touch on the display screen is regarded as the trigger for executing the scroll display.

FIG. 8A illustrates a state where the panorama image, i.e., the display target image, is displayed in its entirety in the whole display mode, and the finger is positioned close to the display screen, thus providing display of the partial enlarged image obtained by enlarging a partial image corresponding to a part of the panorama image, which is displayed at the finger proximate position on the display screen.

FIG. 8B illustrates an image on the display screen that is presented, when the display screen is touched with the finger having been positioned close to the display screen as illustrated in FIG. 8A, immediately after the touch.

When the display screen is touched with the finger having been positioned close to the display screen, a portion of the image after the adjustment, which corresponds to the partial enlarged image displayed at the time of the touching, is now displayed on the display screen as a start image of the scrolling.

FIG. 8C illustrates the scroll display executed such that the portion of the image after the adjustment, which corresponds to the partial enlarged image displayed at the time of the touching, is displayed as the start image of the scrolling.

When the proximity to the display screen is regarded as the trigger for displaying the partial enlarged image and the touch on the display screen is regarded as the trigger for executing the scroll display, the scrolling is started from the touched position, i.e., from the portion of the image after the adjustment, which corresponds to the partial enlarged image displayed at the time of the touching, instead of the head of the image after the adjustment.

In FIG. 8C, the scrolling to the right (i.e., movement of the display range to the right) is started from the portion of the image after the adjustment, which corresponds to the partial enlarged image displayed at the time of the touching.

The scrolling is ended when the display range reaches the last of the image after the adjustment (right end thereof in the illustrated example).

In FIG. 8C, assuming that the time t when the touch is made on the display screen is $t_1$, the scrolling is performed for a predetermined time T from the portion of the image after the adjustment, which corresponds to the partial enlarged image displayed at the time of the touching, to the last of the image after the adjustment. The scrolling is then ended at the time $t=t_1+T$.

In the above description with reference to FIGS. 8A to 8C, when the proximity to the display screen is detected, the display control unit 53 displays the partial enlarged image. Further, when the touch on the display screen is detected thereafter, the display control unit 53 starts the scroll display for displaying the image after the adjustment, i.e., the image obtained by adjusting the size of the display target image, while the image after the adjustment is scrolled in the lengthwise direction of the display target image, from some position in the image after the adjustment, which corresponds to the touched point. As an alternative, when the touch on the display screen is detected, the display control unit 53 may display the partial enlarged image. Further, when the touch on the display screen is released thereafter, the display control unit 53 may start the scroll display for displaying the image after the adjustment, i.e., the image obtained by adjusting the size of the display target image, while the image after the adjustment is scrolled in the lengthwise direction of the display target image, from some position in the image after the adjustment, which corresponds to the point where the touch has been released. In other words, the touch on the display screen may be regarded as the trigger for displaying the partial enlarged image, and the release of the touch from the display screen may be regarded as the trigger for executing the scroll display.

Figure 9A:
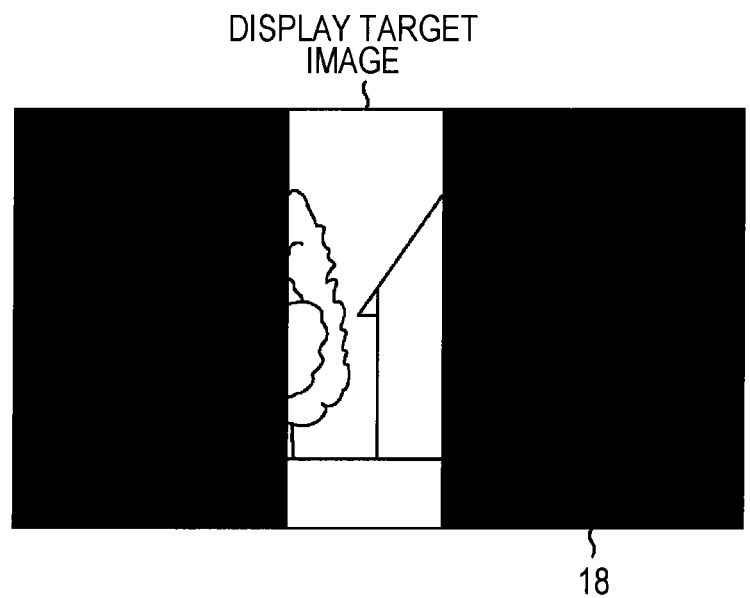
FIGS. 9A and 9B illustrate another display example of the panorama image in the whole display mode.
Figure 9B:
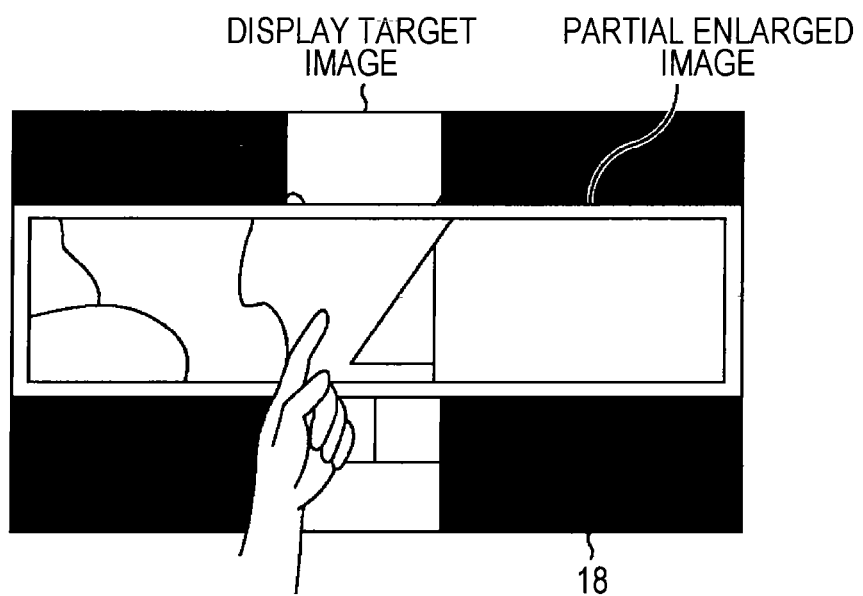

FIGS. 9A and 9B illustrate another display example of the panorama image in the whole display mode.

While the display target image is a horizontally long panorama image in FIGS. 4A to 4C, the display target image is a vertically long panorama image in FIGS. 9A and 9B.

FIG. 9A illustrates a display example on the display screen of the input/output panel 18 (specifically, the display unit 17 thereof) in the state where the user's finger is not touched on the input/output panel 18.

In the state where the user's finger is not touched on the input/output panel 18, the display control unit 53 adjusts the size of a vertically long panorama image as the display target image such that the vertical size of the vertically long panorama image in the lengthwise direction thereof is matched with the vertical size of the display screen (in the lengthwise direction of the panorama image), and then displays the whole of the panorama image (called "whole display").

FIG. 9B illustrates a display example on the display screen of the input/output panel 18 in the state where the user's finger is touched on the input/output panel 18.

In FIG. 9B, the user's finger is touched on the display screen of the input/output panel 18 substantially at a central position in the vertical direction thereof.

In the case of FIG. 9B, the display control unit 53 executes the whole display of the panorama image as in the case of FIG. 9A.

In addition, the enlarged-image generating unit 52 selects, as a partial image to be enlarged, an image in a predetermined range of the panorama image, which is displayed in its entirety, in the vertical direction (i.e., the lengthwise direction of the panorama image) with the touched point of the user's finger being substantially the center of the predetermined range, and then enlarges the partial image. The enlarged-image generating unit 52 further supplies a resulting partial enlarged image to the display control unit 53.

The display control unit 53 displays the partial enlarged image supplied from the enlarged-image generating unit 52 at the touched position of the user's finger on the display screen, i.e., at the position where the partial image is displayed, in superimposed relation to the panorama image that is displayed in its entirety.

Be it noted that the embodiment of the present technology is not limited to the above-described one and it can be variously modified without departing from the gist of the present technology.

More specifically, the present technology can also be applied to other devices for displaying images than the digital camera.

Further, the present technology can be applied to the case of displaying any of a still image and a moving image.

Still further, while the instructed point P is defined in the embodiment as a point on the display screen where the user's finger, for example, is touched or positioned close, the instructed point P can be indicated in some other suitable manner, such as using a pointing device, e.g., a mouse.

The present disclosure contains subject matter related to that disclosed in Japanese Priority Patent Application JP 2010-284321 filed in the Japan Patent Office on Dec. 21, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device, comprising:
    circuitry configured to:
        generate, based on a first user instruction, a partial target image of a display target image displayed on a display area, wherein the partial target image comprises a first width and a first length, the first width is equal to a second width of the display area, and the first length is shorter than a second length of the display area;
        concurrently display a whole of the display target image and the partial target image at a position, wherein the position corresponds to an input position of the first user instruction on the display target image,
        wherein the first user instruction to designate a part of the display target image as the partial target image is received in a state where the whole of the display target image is displayed on the display area, wherein the display area has an aspect ratio different from that of the display target image; and
        display automatic scroll of the display target image from a scroll start position, based on a second user instruction to designate start of the automatic scroll of the display target image,
        wherein the first user instruction is a touch operation, and the second user instruction is a release of the touch operation,
        wherein the release of the touch operation is a trigger for the display of the automatic scroll of the display target image, and
        wherein the scroll start position corresponds to a point on the display target image at which the touch operation is released.

2. The display control device according to claim 1, wherein the circuitry is further configured to:
    receive the first user instruction based on the touch operation at a user selected position of the display area; and
    receive the second user instruction based on the release of the touch operation.

3. The display control device according to claim 1, wherein the circuitry is further configured to adjust a size of the display target image for the automatic scroll so that the size of the display target image, in a direction of the automatic scroll, is larger than a size of the display area.

4. The display control device according to claim 1, wherein the circuitry is further configured to overlay the partial target image on the display target image based on the first user instruction.

5. A display control method, comprising:
    in a display control device:
        generating, based on a first user instruction, a partial target image of a display target image displayed on a display area, wherein the partial target image comprises a first width and a first length, the first width is equal to a second width of the display area, and the first length is shorter than a second length of the display area;
        concurrently displaying a whole of the display target image and the partial target image at a position corresponding to an input position of the first user instruction on the display target image;
        wherein the first user instruction to designate a part of the display target image as the partial target image is received in a state where the whole of the display target image is displayed on the display area, and wherein the display area has an aspect ratio different from that of the display target image; and
        displaying automatic scroll of the display target image from a scroll start position, based on a second user instruction to designate starting of the automatic scroll of the display target image,
        wherein the first user instruction is a touch operation, and the second user instruction is a release of the touch operation,
        wherein the release of the touch operation is a trigger for the display of the automatic scroll of the display target image, and
        wherein the scroll start position corresponds to a point on the display target image at which the touch operation is released.

6. The display control method according to claim 5, further comprising:
    receiving the first user instruction based on the touch operation at a user selected position of the display area; and
    receiving the second user instruction based on the release of the touch operation.

7. The display control method according to claim 5, further comprising:
    adjusting a size of the display target image for the automatic scroll so that the size of the display target image, in a direction of the automatic scroll, is larger than a size of the display area.

8. The display control method according to claim 5, further comprising:
    overlaying the partial target image on the display target image based on the first user instruction.

9. A non-transitory computer-readable medium storing computer-executable instructions thereon, which when executed by a computer, cause the computer to execute operations, the operations comprising:
    generating, based on a first user instruction, a partial target image of a display target image displayed on a display area, wherein the partial target image comprises a first width and a first length, the first width is equal to a second width of the display area, and the first length is shorter than a second length of the display area;

concurrently displaying a whole of the display target image and the partial target image at a position corresponding to an input position of the first user instruction on the display target image, wherein the first user instruction to designate a part of the display target image as the partial target image is received in a state where the whole of the display target image is displayed on the display area; and displaying automatic scroll of the display target image from a scroll start position, based on a second user instruction to designate starting of the automatic scroll of the display target image, wherein the scroll start position is based on an input position of one of the first user instruction or the second user instruction on the display target image, wherein the first user instruction is a touch operation, and the second user instruction is a release of the touch operation, wherein the release of the touch operation is a trigger for the display of the automatic scroll of the display target image, and wherein the scroll start position corresponds to a point on the display target image at which the touch operation is released.

10. The non-transitory computer-readable medium according to claim 9, wherein the operations further comprise:

receiving the first user instruction based on the touch operation at a user selected position of the display area; and receiving the second user instruction based on the release of the touch operation.

11. The non-transitory computer-readable medium according to claim 9, wherein the operations further comprise:

adjusting a size of the display target image for the automatic scroll so that the size of the display target image, in a direction of the automatic scroll, is larger than a size of the display area.

12. The non-transitory computer-readable medium according to claim 9, wherein the operations further comprise:

overlaying the partial target image on the display target image based on the first user instruction.

* * * * *